(12) United States Patent
Hazama

(10) Patent No.: US 6,223,043 B1
(45) Date of Patent: Apr. 24, 2001

(54) COMMUNICATION CHANNEL SELECTION METHOD AND MOBILE COMMUNICATION APPARATUS

(75) Inventor: Kaori Hazama, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/356,466

(22) Filed: Jul. 19, 1999

Related U.S. Application Data

(63) Continuation of application No. PCT/JP98/05506, filed on Dec. 7, 1998.

(51) Int. Cl.[7] .................................................... H04Q 7/20
(52) U.S. Cl. ........................... 455/455; 455/62; 455/427; 455/12.1
(58) Field of Search .................................. 455/427–430, 455/455, 12.1, 512–514, 62

(56) References Cited

U.S. PATENT DOCUMENTS 5,423,084 * 6/1995 Vatt ........................................ 455/62

FOREIGN PATENT DOCUMENTS

| 1128640 | 5/1989 | (JP) . |
| 3112238 | 5/1991 | (JP) . |
| 3131131 | 6/1991 | (JP) . |
| 4152735 | 5/1992 | (JP) . |
| 9224283 | 8/1997 | (JP) . |

* cited by examiner

Primary Examiner—Doris H. To
(74) Attorney, Agent, or Firm—Rothwell, Figg, Ernst & Manbeck

(57) ABSTRACT

When the mobile communication apparatus captures a communication channel, it stores the capture time associated with the communication channel. Thereafter, at the time of channel switching, it retrieves the capture time associated with the same communication channel as the communication channel currently captured. The apparatus further retrieves the nearest capture time to the capture time obtained by the above retrieval, so that by selecting the communication channel associated with the thus obtained capture time with priority, it can perform the channel search in a quite short time.

16 Claims, 10 Drawing Sheets

FIG.2

| ADDRESS | FREQUENCY | TIMING SLOT |
|---|---|---|
| 1 | F1 | T1 |
| 2 | F1 | T2 |
| 3 | F1 | T3 |
| 4 | F2 | T4 |
| 5 | F2 | T5 |
| 6 | F3 | T1 |
| 7 | F3 | T2 |
| 8 | F3 | T3 |
| 9 | F3 | T4 |
| 10 | F3 | T5 |
| 11 | F4 | T1 |
| 12 | F4 | T3 |
| 13 | F4 | T5 |
| ⋮ | ⋮ | ⋮ |

FIG.3

| ADDRESS | FREQUENCY | TIMING SLOT | CAPTURE TIME |
|---|---|---|---|
| 1 | F1 | T1 | SEPTEMBER 3, 10:00 |
| 2 | F4 | T2 | SEPTEMBER 2, 11:00 |
| 3 | F2 | T4 | SEPTEMBER 2, 12:10 |
| 4 | F3 | T1 | SEPTEMBER 2, 11:05 |
| 5 | F1 | T1 | SEPTEMBER 2, 11:20 |
| 6 | F4 | T3 | SEPTEMBER 2, 12:30 |
| ⋮ | ⋮ | ⋮ | ⋮ |

FIG.4

| ADDRESS | FREQUENCY | TIMING SLOT | CAPTURE TIME | |
|---|---|---|---|---|
| 1 | F2 | T4 | SEPTEMBER 1, 18:20 | (CHANNEL C) |
| 2 | F1 | T1 | SEPTEMBER 1, 17:50 | (CHANNEL A) |
| 3 | F3 | T5 | SEPTEMBER 1, 17:30 | (CHANNEL D) |
| 4 | F1 | T2 | SEPTEMBER 1, 17:15 | (CHANNEL E) |
| 5 | F5 | T5 | SEPTEMBER 1, 22:30 | (CHANNEL F) |
| 6 | F1 | T2 | SEPTEMBER 2, 11:00 | (CHANNEL E) |
| 7 | F3 | T5 | SEPTEMBER 2, 11:05 | (CHANNEL D) |
| 8 | F1 | T1 | SEPTEMBER 2, 11:20 | (CHANNEL A) |
| 9 | F2 | T4 | SEPTEMBER 2, 12:10 | (CHANNEL C) |
| 10 | F4 | T3 | SEPTEMBER 2, 12:30 | (CHANNEL B) |
| 11 | F1 | T1 | SEPTEMBER 3, 10:00 | (CHANNEL A) |

COMMUNICATION CHANNEL SELECTION METHOD AND MOBILE COMMUNICATION APPARATUS

CROSS-REFERENCE TO THE RELATED APPLICATION

This Application is a continuation of International Application No. PCT/JP98/05506, whose international filing date is Dec. 7, 1998, the disclosures of which Application are incorporated by reference therein.

BACKGROUND OF THE INVENTION

1. Field of the Invention

The present invention relates to a communication channel selection method and a mobile communication apparatus, and more particularly relates to an improvement of a communication channel selection method for selecting one radio communication channel from a plurality of radio communication channels provided by the system side, and also relates to an improvement of a mobile communication apparatus for selecting one radio communication channel from a plurality of radio communication channels provided by the system side.

2. Description of the Related Art

A mobile communication apparatus such as a portable telephone has a channel selection for selecting a communication channel since the apparatus is generally capable of using a plurality of radio communication channels provided by the communication system, whereby the mobile communication apparatus communicates through a communication channel selected by the channel selection section.

However, all of the communication channels are not always in a usable state. That is, even when a multiplicity of radio communication channels provided by the system side (for example, an earth station) are usable, the radio signal capable of being received by the mobile communication apparatus is limited under a particular circumstance. Accordingly, when determining a communication channel, the channel selection section is required to perform the channel search in such a manner that the communication channels capable of being selected are sequentially selected thereby finding a usable communication channel, that is, a channel capable of receiving the radio signal transmitted from the system side.

The communication channel is defined by frequency and time slot in the case of a portable telephone of the TDMA (time division multiple access) system. While, the communication channel is defined by frequency and spreading code in the case of a portable telephone of the CDMA (code division multiplex access) system. The information for defining the communication channel is called channel information. For, example, in the system employing the GSM (global system for mobile communications) system which is one of TDMA system, several hundred kinds of communication channels can be selected in accordance with combination of the frequencies and the time slots.

Accordingly, in the case where the channel switching is required, communication channels are sequentially selected from a channel list in which selectable communication channels are defined. And, the channel states of the selected communication channels are checked (channel search). When a communication channel in a good channel state is found, this communication channel is acquired. Thereafter, if the channel state of the acquired communication channel has degraded, the same channel search as the aforesaid channel search is executed again. In such a channel search, since communication channels are sequentially selected from the channel list, there is a case where a communication channel in a good channel state can be found through checking only a channel state of one communication channel, but there is also a case where a communication channel in a good channel state can be found for the first time through checking channel state of several hundreds of communication channels.

Although a time required for the checking operation of the channel state differs depending on the communication system, there is a case that the communication system required is a long time for checking operation. If a long time is required for the channel search, there arises a problem that a user can not immediately use the radio communication apparatus for communication, even if the user exists within a service area capable of receiving the radio signal from the system.

On the other hand, there has been proposed a portable telephone in which the communication channels within a channel list are grouped and the communication channels of a particular group are subjected to the checking of the channel states thereof in preference to other groups. In such a portable telephone, the channel list includes the communication channels (home channels) provided by the service company with which a user directly contracted and the communication channels (roaming channels) which are provided by other service companies and available for the same portable telephone by the roaming contract or the like, wherein the home channels and the roaming channels are memorized as separate groups. At the time of the channel search, the selection of the communication channel from the group of the home channels is performed in preference to the other groups, and the communication channel is selected from the group of the roaming channels only when none of all the home channels is in a good channel state.

In general, since the channel charge is cheaper in the home channels rather than the roaming channels, this portable telephone is arranged in such a manner that the communication channels of the channel list are grouped due to the economical reason. According to such grouping of the communication channels, although the time required for the channel search can be shortened within an area where the home channels can be acquired, it takes a long time for the channel search in an outside area where the home channels can not be acquired since only the roaming channels can be acquired.

Further, there has been proposed the system where a system (for example, an earth station) transmits a radio signal including information as to the communication channels of peripheral cells. For example, in the GSM system, the channel information on the radio signal (a cell corresponding to this radio signal is referred to as a serving cell) transmitted from the earth station monitored by the mobile communication apparatus includes the frequency information on cells (referred to as neighboring cells) adjacent to the serving cell. If the frequency information on such neighboring cells is obtained in advance, even when the mobile communication apparatus moves out of the serving area, the next communication channel can be acquired by the channel search in a shorter time by performing the channel search only as to such neighboring cells, compared with the case that the channel search is performed sequentially on the basis of the channel list.

However, as there is a communication system that requires several seconds for one channel checking cycle, even if the channel search is performed only as to the neighboring cells, it takes from several seconds to several tens of seconds to carry out channel switching.

Specifically, it has been a problem that it takes a long time to perform channel switching when there exist many neighboring cells. For example, in the case of a satellite communication system by way of a mobile satellite, the number of cells formed by the communication satellite is not constant, as the relative position of the communication satellite varies. For example, in the nearby area of immediately beneath the cross point of two satellite orbits, the two satellites shifting along their respective orbits independently form their own cells. For this reason, a plurality of cells are formed in a superimposed manner, causing a state in which there exist a plurality of neighboring cells, so that the time required for the channel switching becomes long.

The present invention is provided for solving the problems aforementioned, and it is an object of the present invention to provide a communication terminal apparatus capable of selecting in a short time a desired communication channel at the time of channel switching, by storing the capture time of communication channels in advance.

SUMMARY OF THE INVENTION

A communication channel selection method according to the present invention comprises the steps of: storing the capture time of communication channels, each being associated with the respective communication channels as history information, retrieving the history information stored by the storing step at the time of switching of the communication channels, selecting a communication channel on the basis of the result of said retrieving step, detecting the channel state of the communication channel selected by the selecting step, and capturing the selected communication channel on the basis of the result of the detecting step. For this reason, at the time of channel switching, the communication channel having high possibility of being captured can be selected with priority on the basis of the history information containing the channels previously captured.

Further, in the communication channel selection method according to the present invention, the storing step stores the capture time for each of the communication systems that provide communication channels, and the retrieving step performs data retrieval at the time of switching of the communication systems as to the capture time stored in the respective communication systems before or after the switching operation. For this reason, at the time of switching from a communication system to another communication system, the communication channel having high possibility of being captured can be selected with priority on the basis of the history information containing the channels previously captured in the both communication systems.

On the other hand, a mobile apparatus according to the present invention comprises: a history information storing section for storing the capture time of communication channels, each being associated with the respective communication channels as history information, a history information retrieving section for retrieving the history information stored in the history information storing section at the time of switching of the communication channels, a channel selecting section for selecting a communication channel on the basis of the result of the retrieval conducted by said history information retrieving section, and a channel monitoring section for detecting the channel state of the communication channel selected by said channel selecting section, Wherein the apparatus captures the selected communication channel on the basis of the result of the detection conducted by the channel monitoring section. For this reason, at the time of channel switching, the communication channel having high possibility of being captured can be selected with priority on the basis of the history information containing the channels previously captured.

Further, in the mobile communication apparatus according to the present invention, the history information storing section is formed by two or more than two storing sections for storing the capture time for each of the communication systems that provide communication channels, and the history information retrieving section performs data retrieval, at the time of switching of the communication systems, in the storing section as to the respective communication system before or after the switching operation.

For this reason, at the time of switching from a communication system to another communication system, the communication channel having high possibility of being captured can be selected with priority on the basis of the history information containing the channels previously captured in the both communication systems.

BRIEF DESCRIPTION OF THE DRAWINGS

FIG. 2 is a diagram showing an example of the data forming a channel list 7 shown in FIG. 1.

FIG. 3 is a diagram showing an example of data arrangement stored in a history information storage section 4 shown in FIG. 1.

FIG. 4 is a diagram showing another example of data arrangements stored in the history information storage 4, and showing also an example of the operation of the history information retrieve section 6.

DETAILED DESCRIPTION OF THE PREFERRED EMBODIMENTS (First Embodiment)

Figure 1:
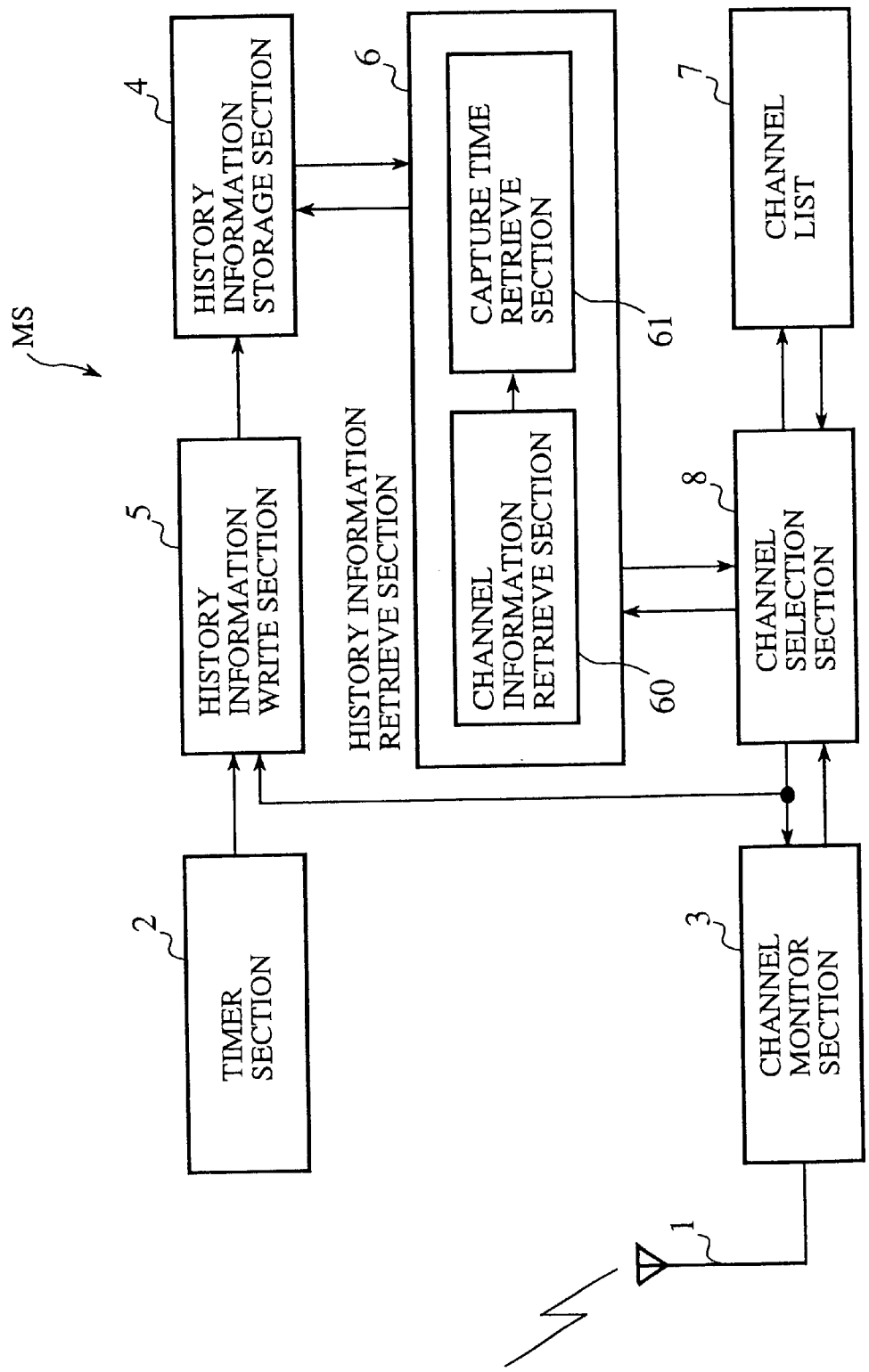
FIG. 1 is a schematic diagram showing one example of the arrangement of a mobile communication apparatus according to the present invention (first embodiment).

FIG. 1 is a block diagram showing an example of the arrangement of a mobile communication apparatus MS according to the present invention. In FIG. 1, reference numeral 1 denotes an antenna section for receiving a radio signal from a system side communication apparatus (not shown). Reference numeral 2 denotes a timer section. Reference numeral 3 denotes a channel monitor section for monitoring the channel state of a communication channel. Reference numeral 4 denotes a history information storage section for storing the capture time of a communication channel therein. Reference numeral 5 denotes a history information write section for writing the capture time in the history information storage section 4. Reference numeral 6 denotes a history information retrieve section for retrieving the data within the history information storage section 4. Reference numeral 7 denotes a channel list defining selectable communication channels in advance. And reference numeral 8 denotes a channel selection section for selecting the communication channel from the channel list 7.

The channel list 7 is stored in a storage means for storing the channel information of communication channels selectable by the mobile communication apparatus MS. Usually, the list 7 may be stored in a nonvolatile storage means such as a ROM, EPROM, flash memory or the like. Alternatively, the channel list may be stored in a volatile storage means such as a DRAM, SRAM or the like in which the channel information is copied as the need arises from the nonvolatile storage means such as a hard disk, optical disk, ROM, EPROM, flash memory or the like.

FIG. 2 is a diagram showing an example of the data forming the channel list 7. There is described a case in which the mobile communication apparatus MS is applied to the portable telephone of the TDMA system. The channel list 7 defines selectable several hundred kinds of communication channels formed by the combination of the carrier frequencies of the radio signal [F1, F2, F3 . . . ] and the time slots [T1, T2, t3 . . . ] which represents the synchronous timing. For example, in the address 1, the communication channel [F1-T1] (indicating that the frequency is F1 and the time slot is T1, and similar indication hereinafter) is defined, while in the address 10, the communication channel [F3-T5] is defined.

The channel selection section 8 is a means for selecting a communication channel in the channel switching operation at the time of call-waiting, and determines the order of the channel search. If the history information is not used during the channel search, the channel selection section 8 selects a communication channel from the list 7. The channel selection section 8 generates an address signal and supplies it to the channel list 7 to select a communication channel, thereby reading the frequency and the time slot of the selected communication channel. The frequency and the time slot thus read are sent to the channel monitor section 3. On the other hand, in a case that the history information is used, the channel selection section 8 first sends a request signal to the history information retrieve section 6, and sends the channel information output from the history retrieve section 6 to the channel monitor section 3.

The channel monitor section 3 detects the channel state of the selected communication channel, and sends back the result of the detection to the channel selection section 8. The detection result of the channel state is binary value or multi-value data representing good or bad channel state of the selected communication channel. When the detected channel state does not satisfy a predetermined quality level, the channel selection section further selects another communication channel from the channel list 7. On the other hand, when the detected channel state satisfies a predetermined quality level, the channel selection section 8 captures the selected communication channel. Due to this, the mobile communication apparatus MS registers the position with respect to the system side communication apparatus that provides the captured communication channel. Further, the channel monitor section 3 continues to monitor the radio signal from the system side communication apparatus, and monitor the channel state of the currently captured communication channel.

The timer section 2 is formed by a timer circuit that measures the elapse of time to output the exact time. The time output from the timer section 2, however, may be the time that can be used only within the apparatus MS. For example, it can be the time on the basis of the reset time or power-on time. Although hour, minute and date (or month and date) are used in this embodiment, it can be arranged such that they are used together with the year data, or that only hour and minute are used, as the occasion demands.

The history information write section 5 writes into the history information storage section 4 the time at which the communication channel is captured at the time of call-waiting on the basis of the output signal from the timer section 2 and the channel selection section 8. That is, when a communication channel whose channel state is good is found on the basis of the output from the channel monitor section 3 at the time of channel search, the channel selection section 8 sends a write request signal, together with the channel information. The history write section 5 writes the time output from the timer 2 in association with the channel information output from the channel selection section 8 into the history information storage section 4.

The history information storage section 4 is a storage means for storing the time at which a communication channel is captured as the history information, in association with the captured communication channel. The history information storage section 4 may be realized by a writable storage means, that is, a volatile storage means such as a DRAM, SRAM or the like, or a nonvolatile storage means such as a flash memory, EPROM or the like.

FIG. 3 is a diagram showing an example of the data arrangement stored in the history information storage section 4. In the arrangement shown in FIG. 3, for example, the capture time "September 3, 10:00 (end quotation mark) is stored in the same address (address 1) in association with the channel information [F1-T1].

The history information retrieve section 6 is a means for retrieving the history information stored in the history information storage section 4 in accordance with a request for retrieval from the channel selection section 8, and is formed by a channel information retrieve section 60 and a capture time retrieve section 61. When starting the channel search the channel selection section 8 outputs the channel information of the communication channel currently captured, together with the request for retrieval. The channel information retrieve section 60 retrieves the history data stored in the history information storage section 4 in accordance with this request signal, taking the channel information as a key element, and reads out the capture time associated with the same communication channel. The capture time retrieve section 61 reads out a communication channel related to the nearest capture time to the capture time read by the channel information retrieve section 60, and sends it back to the channel selection section 8.

Here, the data retrieval by the channel information retrieve section 60 is performed in order to find out the time at which the same communication channel was captured in the previous time. This capture time is called a "previous capture time". Since the data retrieval by the channel information retrieve section 60 is performed by taking the channel information of the communication channel currently captured as a key element, the time written when the current communication channel was captured is detected as the latest time. For this reason, for finding out the previous capture time, the second latest capture time associated with the same communication channel has to be retrieved.

It is to be noted that if it is arranged such that the channel information write section 5 temporally stores the channel information and the capture time at the time of channel switching, and it writes this history information into the history information write section 4 but at the next channel switching, then the latest time retrieved by the channel information retrieve section 60 will be the previous capture time.

After the channel monitor section 3 detects the channel state of a communication channel which is the nearest to the previous capture time and obtained by the capture time retrieve section 61, if the channel state is not in the good state, it retrieves the second nearest capture time to the previous capture time in accordance with the instruction of the channel selection section 8. In this way, the capture time is retrieved starting from the nearest to the previous capture time sequentially, and communication channels each associated with each of the capture times are output sequentially.

FIG. 4 is a diagram showing another example of the data arrangement stored in the history information storage 4, and showing also an example of the operation of the history information retrieve section 6. Here, assuming that the history information storage section 4 contains 11 history information (address 1 to 11) as shown in FIG. 4, and the communication channel A [F1-T1] is currently captured. That is, the communication channel A [F1-T1] (address 11) captured at September 3, 10:00 is still now captured. The history information of the same communication channel as the communication channel A has been stored also in the addresses 2 and 8, and the capture time in the address 8 is newer. For this reason, the previous capture time obtained through the retrieval by the channel information retrieve section 60 at the time of channel switching becomes [September 2, 11:20] (address 8). Further, the nearest capture time obtained through the retrieval of the capture time retrieve section 61 is [September 2, 11:05] (address 7), and the second nearest capture time is [September 2, 12:10] (address 9). Therefore, channel information are output to the channel selection section 8 in the order of communication channel D [F3-T5] and communication channel C [F2-T4].

Figure 5:
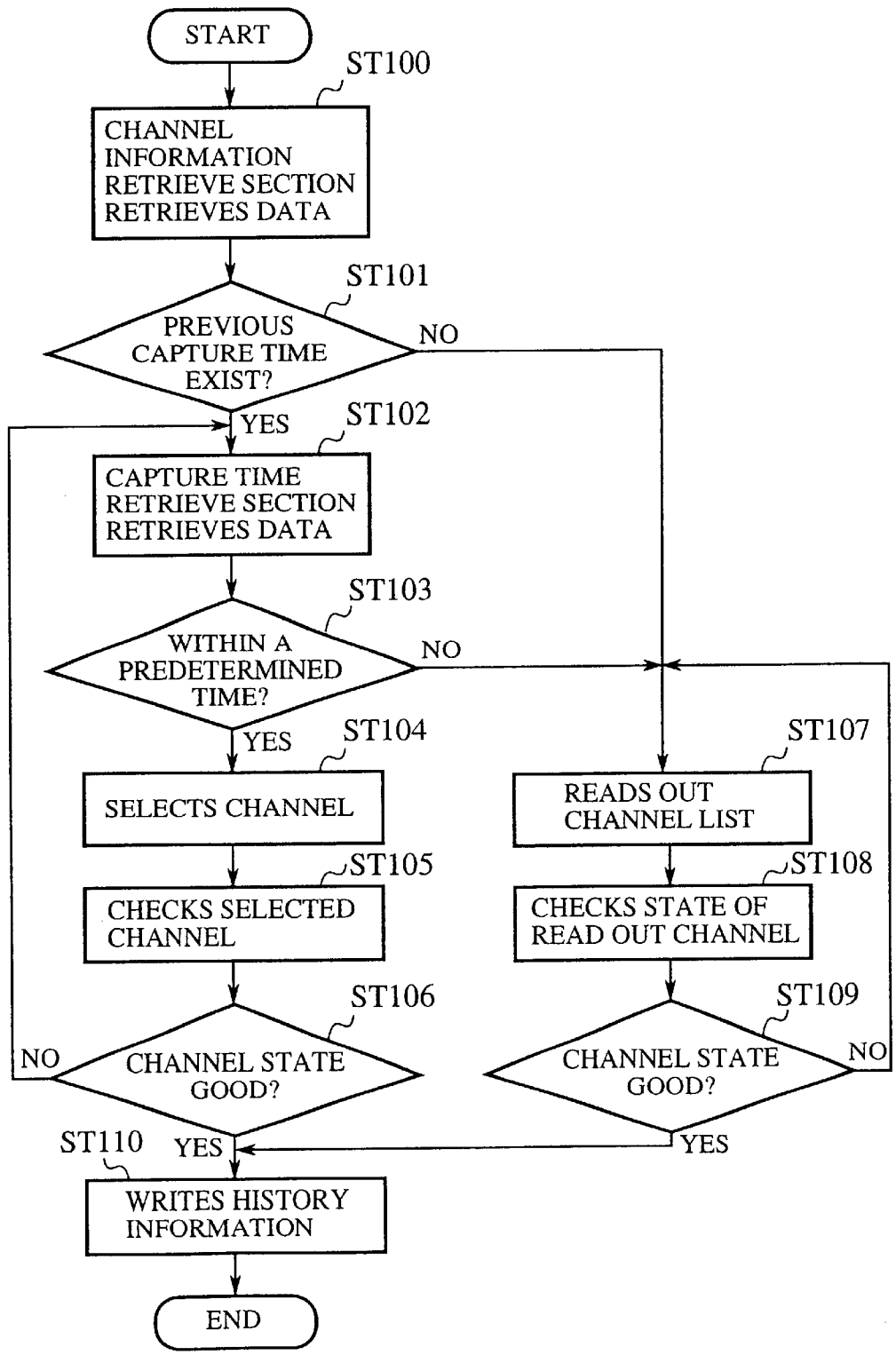
FIG. 5 is a flow chart of steps S100 to S110 showing an example of the operation of the mobile communication apparatus shown in FIG. 1 and showing the operation at the time of channel switching.

FIG. 5 is a flow chart of steps S100 to S110 showing an example of the operation of the mobile communication apparatus shown in FIG. 1, and showing the operation at the time of channel switching. This process is executed when a channel switching event is generated. The channel switching event is issued in the case that the channel monitor 3 has detected that the channel state of the communication channel currently captured has degraded, or that the a user has given an instruction of channel switching by operating an input means such as his input keys or the like.

First, the channel selection section 8 outputs the channel information of the communication channel currently captured, together with a request for retrieval, and the channel information retrieve section 60 retrieves the history information associated with his channel information within the history storage section 4 (in step S100). By this retrieval, the capture history of the currently captured communication channel is always found out (in step S101) When no history information other than this (in step S101) is found out, it means that there is no previous capture time stored in the history information storage section 4. For this reason, the channel information retrieve section 60 sends back the information of "no corresponding data" to the channel selection section 8. At this stage, the channel selection section 8 starts a normal channel search (in steps S107 to S109). In other words, the channel selection section 8 sequentially selects the communication channels from the list 7, and the channel monitor section 3 checks repeatedly the channel state of the selected channels until it finds out and captures the communication channel in a good channel state.

On the other hand, if two or more than two pieces of history information are found out by the data retrieval (conducted in step S100), the channel information retrieve section 60 outputs the second latest capture time as a previous capture time (in step S101). The capture time retrieve section 61 retrieves the nearest history information in terms of time to this previous capture time in the history information storage section 4 (in step S102). As a result of this retrieval, the channel information of another communication channel which had been captured around the time at which the same communication channel was previously captured can be obtained. The capture time retrieve section 61 compares the difference between the nearest capture time to the previous capture time and the previous capture time found out by this retrieval with a predetermined value (in step S103). As a result of this comparison, if the calculated value exceeds the predetermined value, it is judged that there is no communication channel which was captured around the previous capture time, and sends the information of "no corresponding data" back to the channel selection section 8. The channel selection section 8 starts a normal channel search (in steps S107 to S109) on receiving this information. On the other hand, if the calculated difference value is less than the predetermined value, the capture time retrieve section 61 outputs the channel information associated with that capture time.

On the basis of the channel information output from the capture time retrieve section 61, the channel selection section 8 selects a communication channel (in step S104), That is, it sends the channel information to the channel monitor section 3, and instructs to check the channel state of the selected channel. The channel monitor section 3 detects the channel state of this communication channel, and sends back the result of the detection to the channel selection section 8 (in step S105).

If the channel state is not in a good state (in step S106), the capture time retrieve section 61 retrieves the next latest capture time to the second nearest capture time on the basis of the instruction from the channel selection section 8. Regarding the result of this retrieval, the comparison with the predetermined value, the selection of the communication channel, checking of the channel state and so on are repeatedly performed (in steps S102 to S106). On the other hand, if the channel state is in a good state, the channel selection section 8 captures the thus selected communication channel (in step S106).

When a communication channel is captured in steps S106 and S109, the channel selection section 8 outputs the channel information thereabout and a write request. The history information write section 5 writes, in accordance with this write request, into the history information storage section 4 the time output from the timer section 2 associated with the channel information output from the channel selection section 8 (in step S110), and ends the process.

Figure 6:
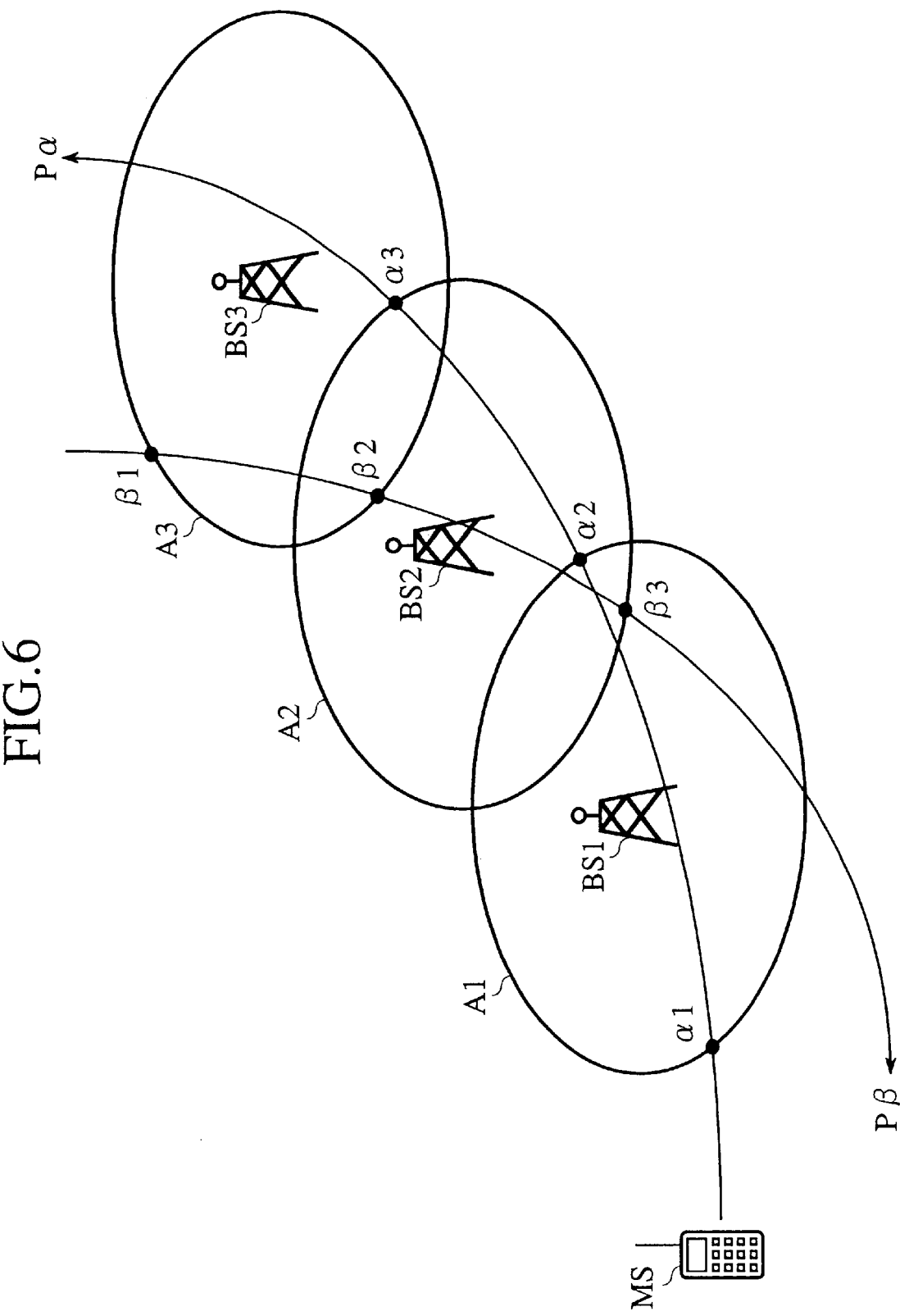
FIG. 6 is a schematic diagram showing an example of the system arrangement including the mobile communication apparatus MS shown in FIG. 1.

FIG. 6 is a schematic diagram showing an example of the system arrangement including the mobile communication apparatus. This system is an earth communication system, wherein MS denotes a mobile communication apparatus shown in FIG. 1, BS1 to BS3 denote earth stations in the portable type telephone system, and A1 to A3 denote cells respectively covering these earth stations BS1 to BS3. Here, the cell A1 is an area in which the communication channel [F1-T1] can be captured, A2 is an area in which the communication channel [F2-T2] can be captured, and A3 is an area in which the communication channel [F3-T3] can be captured.

If a user carrying the mobile communication apparatus MS passes along the path Pα through the cells A1, A2 and A3 in order, the capture time T1 of the communication channel [F1-T1] is stored at the point α1, the capture time T2 of the communication channel [F2-T2] is stored at the point α2, and the capture time T3 of the communication channel [F3-T3] is stored at the point α3.

Thereafter, when the same user passes again along the path Pα, at the point α2, the communication channel [F2-T2] associated with the nearest time T2 to the previous capture time T1 is retrieved, and the channel selection and the channel check are performed with respect to this communication channel with priority. In the same way, at the point α3, the communication channel [F3-T3] is checked with priority. Accordingly, the channel search can be done in a quite short time.

The same may be applied to the case in which the same user passes along the path Pβ near the path Pα in the reverse direction. Namely, at the point β2, the communication channel [F2-T2] associated with the nearest time T2 to the previous capture time T3 of the communication channel [F3-T3] currently captured is retrieved, and the channel check is performed in preference, so that the channel search can be done in a quite short time.

Generally, in comparison with the service area of the communication system, the sphere of human activity is not so wide. Further, the place at which one stays for a long time is limited, for example, to his house, his working place and so forth. Still further, the path along which one passes in his daily life is almost fixed in most cases. For this reason, it is highly possible that one person who goes out of his house carrying a portable telephone comes back home passing the reverse route of the same way.

If a channel switching was made in the past, the cells covering the communication channel before and after the channel switching are considered to be adjacent to each other along the user's activity path. Further, if the user's sphere of activity is limited, or his activity path is made to a pattern, the user passes again the boundary of these cells.

The mobile communication apparatus of this embodiment first stores the capture history of the communication channels, and at the time of channel switching, it selects the communication channel which had been captured around the previous capture time of the same communication channel with priority on the basis of the capture history of the communication channels, and accordingly the time required for channel search can be greatly reduced.

The present embodiment has been explained as to the case in which the mobile communication apparatus MS is shifting its position the whole time with reference to FIG. 5. However, even when the communication apparatus MS is in a halt state, or it is moving at a quite low speed, if the apparatus MS is in the nearby area of the boundary to the adjacent cell (overlapped area with the adjacent cell), in most cases, cells having a good channel state are replaced with each other in a quite short time due to various conditions, namely in such cases in which a user is in a valley between tall buildings, walking within a room, or repeatedly walking in and out of the room and so on. According to the present invention, it is rarely required to conduct channel checkings about unnecessary communication channels, especially in these cases, so that more prominent effects can be obtained.

Further, the present embodiment has been explained as to the case in which the present invention is applied to a terrestrial communication system in which a mobile communication apparatus MS performs radio communication directly with earth stations BS1 to BS3. However, the present invention can be applied also to a satellite communication system in which a mobile communication apparatus MS communicates with earth stations through a communication satellite (not shown).

Specifically, if the communication satellite is a mobile satellite, a prominent effect can be obtained by the present invention. That is, when the communication satellite moves along a predetermined orbit, the cell provided by way of the communication satellite also moves. In this case, when the orbit period of the communication satellite is over, the same cell can be formed in the same position. For this reason, if the communication satellite is in a motionless state, same channel switching is repeated at every satellite period, and accordingly, if the channel search is performed by selecting a communication channel on the basis of the previous history information which was obtained integer number times of one satellite period before, the channel check as to unnecessary communication channels is no longer needed, thereby providing a prominent effect.

(Second Embodiment)

In this embodiment, another example of the arrangement of a mobile communication apparatus is explained with reference to FIG. 1.

The first embodiment has explained as to the case in which the channel state retrieve section 60 retrieves the previous capture time. However, in this embodiment, the channel state retrieve section 60 retrieves all the previous capture times associated with the same communication channel as that currently captured. Each of the capture times obtained by this retrieval is called a first capture time.

Next, the capture time retrieve section 61 retrieves the nearest capture time to each of the previous capture times obtained by this retrieval, and the capture time obtained by this retrieval is called a second capture time. Then, with respect to each combination, the difference between the first capture time and the second capture time is obtained, and the capture time whose time difference is the lowest is adopted as a capture time for reference. This is called a reference capture time.

After obtaining the reference capture time, the capture time retrieve section 61 retrieves sequentially the capture times near the reference capture time stored in the history information storage section 4, and the channel information associated with the capture times is sequentially read out and sent to the channel selection section 8. That is, the operation after obtaining the reference capture time is samely carried out, but by replacing the previous capture time in the first embodiment by this reference capture time.

Figure 7:
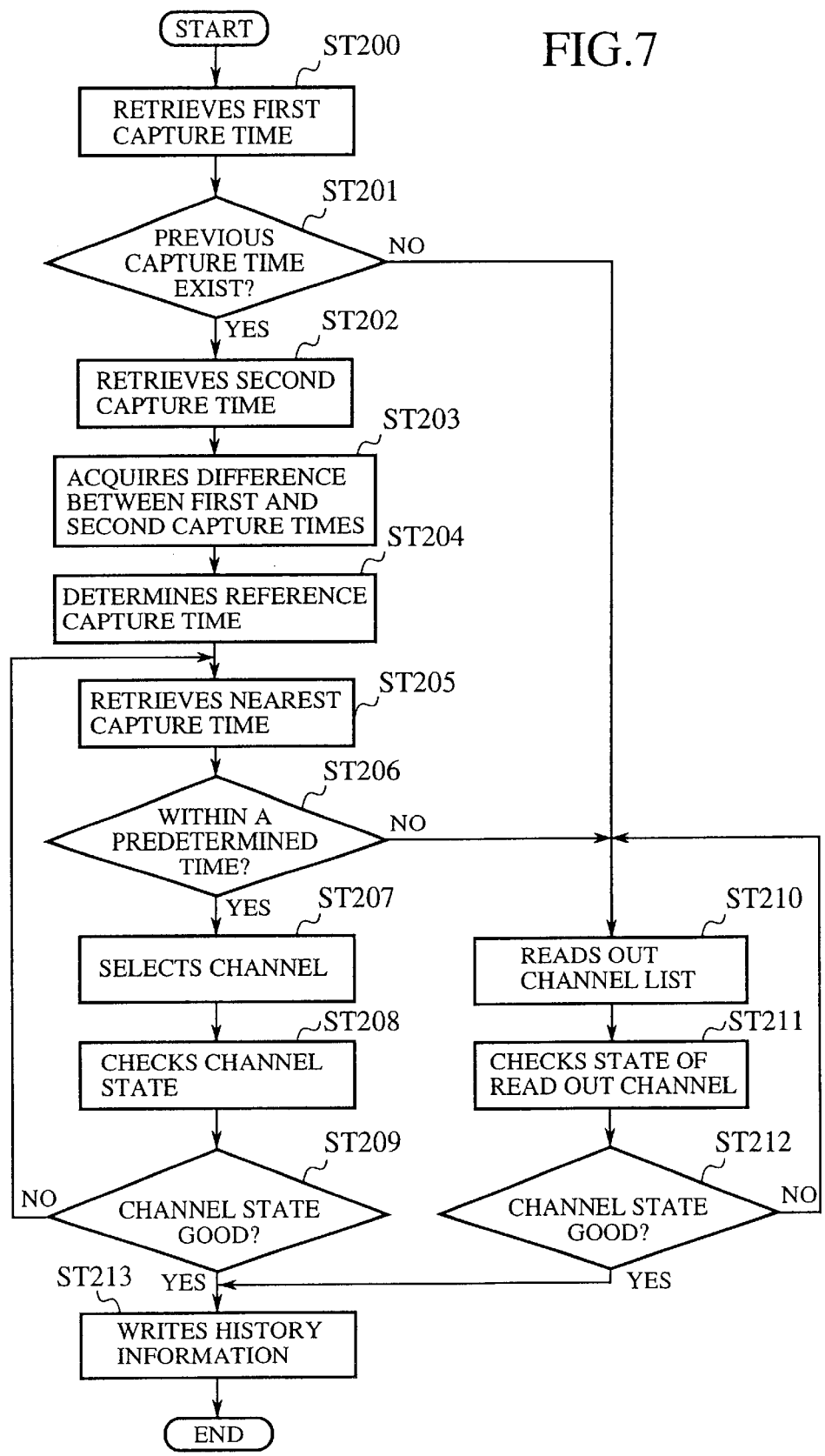
FIG. 7 is a flow chart of steps S200 to S213 showing another example of the operation of the mobile communication apparatus, and showing the operation at the time of channel searching. This figure differs from the flow chart shown in FIG. 5 in its steps S200 to S205 (second embodiment).

FIG. 7 is a flow chart of steps S200 to S213 showing an example of the operation of the mobile communication apparatus MS according to the present invention, and is showing an operation at the time of channel switching. When this figure is compared with the flow chart of FIG. 5 in the first embodiment, the steps S200 to S205 are different from the flow chart of FIG. 5. This process is carried out when the channel switching event is generated. The channel switching event is generated when the channel monitor section 3 has detected that the channel state of the communication channel currently captured has degraded, or when a user has operated his input means such as his input keys and instructed the channel switching.

First, the channel selection section 8 outputs channel information and a request signal for retrieval of the communication channel currently captured, and the channel information retrieve section 60 retrieves all the history information associated with this channel information within the history information storage section 4 (in step S200). When no history information other than this (in step S101) is found out by this retrieval, the channel information retrieve section 60 sends back such information as "no corresponding data" to the channel selection section 8. At this stage, the channel selection section 8 starts a normal channel search (in steps S210 to S212).

On the other hand, if two or more than two pieces of history information are found out by the data retrieval (conducted in step S200), the channel information retrieve section 60 outputs all the capture times except the latest capture time (that is, capture history of the communication channel currently captured) as the first capture times (in step S201).

The capture time retrieve section 61 retrieves the nearest history information in terms of time to each of the first capture times in the history information storage section 4 (in step S202). In other words, the operation for obtaining the second capture time by the data retrieval taking the first capture time as a key is repeated as many times as the number of the first capture times.

Next, the capture time retrieve section 61 obtains the difference between the first capture time and the second capture time (in step S203). In other words, it is detected as to how the first capture time obtained by the channel information retrieve section 60 is different from other nearest capture time in terms of time. Further, the capture time retrieve section 61 compares each of the thus obtained differences mutually, and takes the first capture time whose difference is the smallest as a reference time (step S204). Thereafter, it outputs the channel information associated with the nearest capture time to the first capture time (in step S205). Since the nearest capture time in step S205 is the second capture time obtained in step S202, there is no need to retrieve at this stage. In this way, it is possible to obtain the channel information of other communication channel switched to that communication channel, or to which the communication channel has been switched around the time at which the same communication channel was captured.

Lastly, the capture time retrieve section 61 compares the difference between the nearest capture time obtained in step S205 and the previous capture time with a predetermined value (in step S206). As a result, if the resultant value exceeds the predetermined value, it is judged that there is no communication channel captured around the previous capture time, and returns the information of "no corresponding data" to the channel selection section 8, and starts operating the normal search (in steps S210 to S212). On the other hand, if the resultant value is less than the predetermined value, the capture time retrieve section 61 outputs the channel information associated with the capture time.

The channel selection section 8 selects a communication channel on the basis of the capture time information output from the capture time retrieve section 61 (in step S207). That is, it sends the channel information to the channel monitor section 3, and instructs to check the channel state. The channel monitor section 3 detects the channel state of this communication channel, and returns the result of the detection to the channel selection section 8 (in step S208).

If the channel state is not in a good state (in step S209), the capture time retrieve section 61 retrieves the second nearest capture time to the reference capture time in accordance with the instruction of the channel selection section 8 (in step S205). Thereafter, it repeats the selection of communication channel, check of the channel state and so forth on the basis of the detected result (in steps S205 to S209). On the other hand, if the channel state is in a good state, the channel selection section 8 captures that communication channel (in step S209).

When a communication channel is captured in steps S209 and S212, the channel selection section 8 outputs the channel information and a write request. The history information write section 5 writes, in accordance with this write request, into the history information storage section 4 the time output from the timer section 2 in association with the channel information output from the channel selection section 8, and ends this process (in step S213).

The first embodiment has explained as to the case in which the previous capture time regarding the same communication channel is retrieved, and then a communication channel capable of being captured is detected by use of the information of channel switching performed around the previous capture. Contrary to this, in this embodiment, not only the previous capture time, but another capturable communication channel is retrieved also in consideration of the time at which the same communication channel was captured before the previous capture time. That is, in this embodiment, all the capture time information in the past regarding the same communication channel is estimated, taking the capture time around which the channel switching was possibly performed as a reference capture time, and thereafter similarly to the first embodiment, a communication channel which can be captured is retrieved by use of the information of channel switching performed around this reference capture time.

Accordingly, channel search can be performed by an effective use of the history information stored in the past.

For example, let us assume that a user once passed through the path Pα or Pβ, and the channel switching is performed at each of the points α1 to α3 or β1 to β3. Thereafter, the same user switched off the power source of the mobile communication apparatus MS before entering the cell A2, and switched on the apparatus MS within the cell A2 in order to capture the communication channel of the earth station BS2, and after a little while he switched off the MS again and went out of the cell A2. In this case, the apparatus has not captured the communication channel of the earth station BS3 around the time Tx at which the communication channel of the earth station BS2 was captured. Accordingly, even if the user passes along the path Pα and performs a channel switching at the point α3 thereafter, the capture history of the earth station BS3 can not be retrieved on the basis of the previous capture time Tx.

However, since the user had passed along the path Pα or Pβ in the past, the capture time Ty1 of the earth station BS2 which is before the previous capture time Tx has definitely been stored in the history information storage section 4. In addition, the capture time Ty2 of the earth station BS3 near this capture time Ty1 has also definitely been stored in the history information section 4. On the other hand, in the case that the user entered and left the cell A2 with his mobile communication apparatus MS being switched off, no channel switching was performed around that time. Due to this, the capture time Tx of the communication channel of the earth station BS2 is far from the capture time in terms of time at which another communication channel was captured.

For this reason, according to the present embodiment, the capture time Ty1 is set as a reference capture time, and the capture time Ty2 can be retrieved on the basis of this reference capture time, so that the communication channel of the earth station BS3 can be thus searched in preference.

As explained above, according to the present embodiment, a communication channel can be searched on the basis of the history information in which the same channel was captured before the capture time or earlier than that time, and due to this, even when no communication channel can be captured through the previous capture time, the time required for the channel search can be shortened.

(Third Embodiment)

Figure 8:
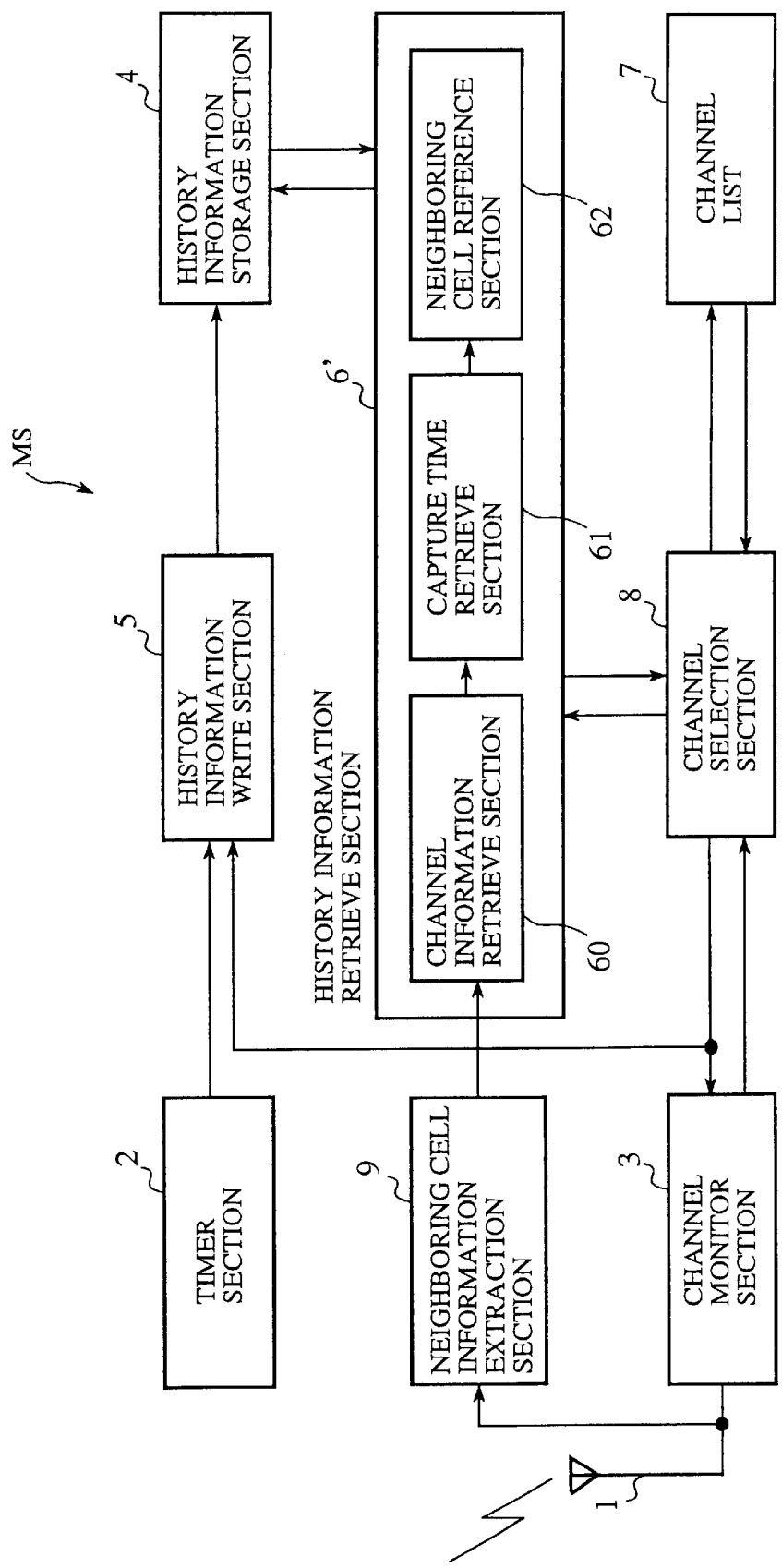
FIG. 8 is a block diagram showing another example of the arrangement of a mobile communication apparatus according to the present invention. This mobile communication apparatus is formed by the mobile communication apparatus of FIG. 1 further being provided with a neighboring cell information extracting section 9 and a neighboring cell information reference section 62 (third embodiment).

FIG. 8 is a block diagram showing an example of another arrangement of the mobile communication apparatus MS according to the present invention. This mobile communication apparatus is arranged to further include a neighboring cell information extraction section 9 and a neighboring cell reference section 62 in addition to the arrangement of the mobile communication apparatus shown in FIG. 1. This mobile communication apparatus is employed in a communication system in which the channel information on a neighboring cell(s) is included within the channel information contained in the radio signal transmitted from the system side communication apparatus (for example, an earth station).

The neighboring cell information extraction section 9 extracts the channel information on a neighboring cell, that is, the frequency and the time slot in the case of the TDMA system, the frequency and the spreading code in the case of the CDMA system, from the channel information contained in the received signal at the timing of call-waiting.

The history information retrieve section 6' is formed by the channel information retrieve section 60, the capture time retrieve section 61 and the neighboring cell reference section 62. The neighboring cell reference section 62 judges whether or not the communication channel output from the capture time retrieve section 61 is contained in the channel information extracted from the neighboring cell information extraction section 9.

The channel information retrieve section 60 retrieves the history information stored in the history information storage section 4, taking the channel information as a key element on the basis of a request for retrieval output from the channel selection section 8, and reads out the previous capture time of the same communication channel. The capture time retrieve section 61 retrieves the history information in the history information storage section 4, taking the previous capture time as a key element, and reads out a communication channel of the nearest capture time to this previous capture time.

The neighboring cell reference section 62 is provided with a neighboring cell storage section (not shown). This neighboring cell storage section stores the channel information of the neighboring cell output from the neighboring cell extraction section 9. Although this stored data is updated, as occasion calls, on the basis of the output from the neighboring cell information extraction section 9, the data updating operation is interrupted during the channel searching period.

The neighboring cell reference section 62 retrieves the channel information stored in the neighboring cell storage section, taking the channel information output from the capture time retrieve section 61 as a key element. As a result of this, if there exists a communication channel whose channel information is coincident with the channel information within the neighboring cell storage section, it outputs the channel information thereof to the channel selection section 8. After the channel monitor section 3 checks the channel state of this communication channel, if, as a result, the channel state thereof is not in a good state, the capture time retrieve section 61 retrieves the second nearest capture time to the previous capture time on the basis of the instruction from the channel selection section 8. Further, if the channel information output from the capture time retrieve section 61 does not coincide with the channel information stored in the neighboring cell storage section, the capture time retrieve section 61 retrieves the second nearest capture time to the previous capture time on the basis of the instruction from the neighboring cell reference section 62. Then, the neighboring cell reference section 62 compares again the channel information of the neighboring cell with the result of the retrieval.

In this way, when the retrieval by the capture time retrieve section 61 has been repeatedly performed, or when there is not enough history information stored within the history information storage section 4, the capture time retrieve section 61 cannot retrieve the communication channels captured within a predetermined time after the previous capture time. In this case, the neighboring cell reference section 62 sequentially outputs the channel information of the neighboring cells, which information has been stored in the neighboring cell storage section, but whose channel check has not been performed yet, to the channel selection section 8. Then, after the channel check is performed about all the channel information stored in the neighboring cell information storage section, if no communication channel whose channel state is in a good state is found, the information of "no corresponding data" is returned to the channel selection section 8.

Figure 9:
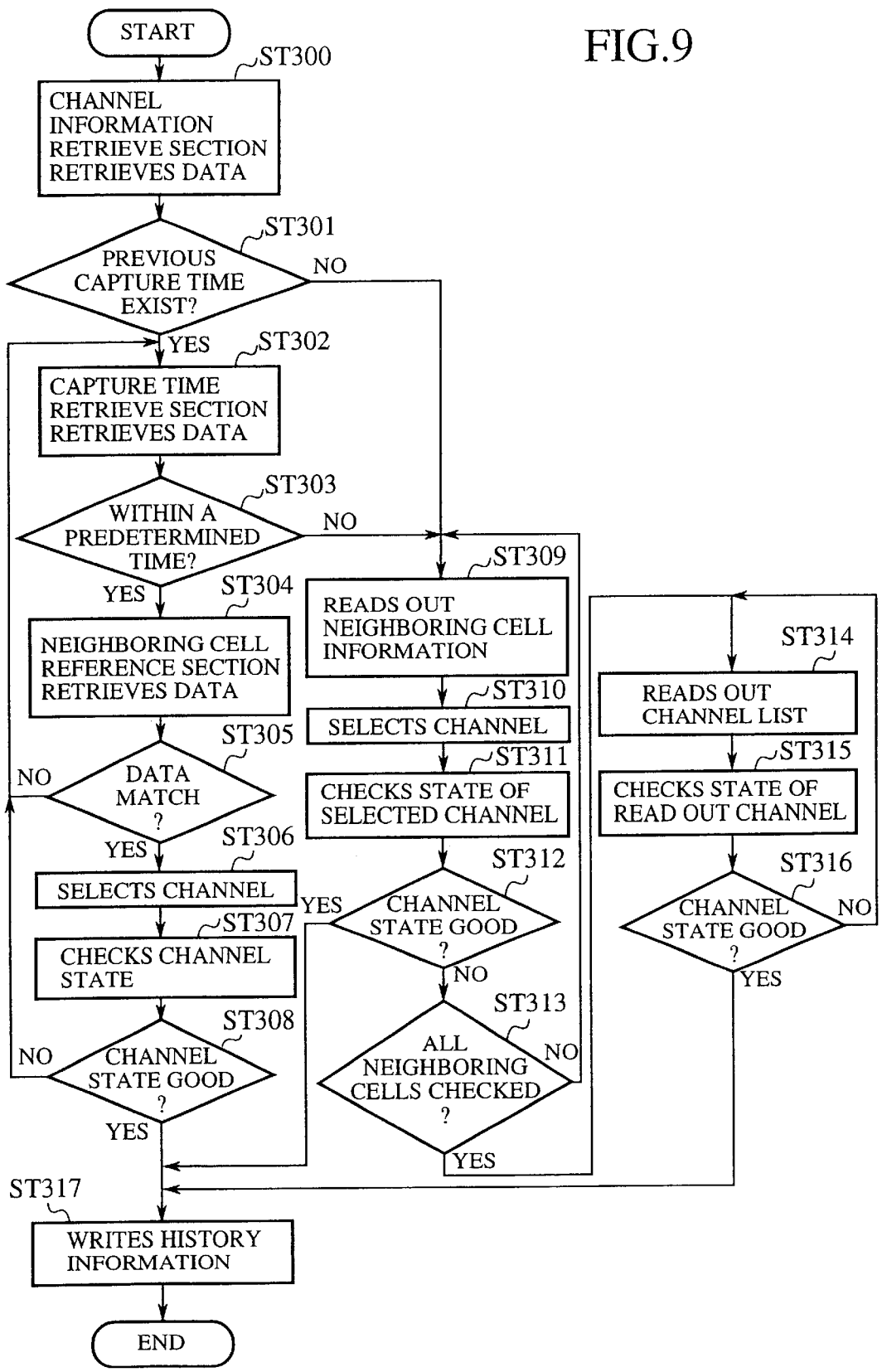
FIG. 9 is a flow chart of steps S300 to S317 showing an example of the operation of the mobile communication apparatus shown in FIG. 8 and showing the operation at the time of channel switching.

FIG. 9 is a flow chart of steps S300 to S317 showing an example of the operation of the mobile communication apparatus shown in FIG. 8 and showing the operation at the time of channel switching. In this process, channel search for communication channel of the neighboring cell is performed with priority, and further, among the communication channels of the neighboring cells, the channel search is performed with priority as to the communication channel having the capture history near the previous capture time of the communication channel currently captured.

First, in accordance with the generation of the channel switching event, the channel selection section 8 outputs channel information of the communication channel currently captured, together with a request for retrieved. By this operation, the neighboring cell information storage section stops updating the data. The channel information retrieve section 60 retrieves history information within the history information storage 4, taking the channel information as a key element on the basis of this request for retrieval (in step S300). As a result, when two or more than two pieces of history information are found, the channel information retrieve section 60 outputs the second latest capture time as a previous capture time (in step S301).

On the other hand, when the previous capture time cannot be found during the data retrieving operation in step S300, the channel information retrieve section 60 sends the information of "no corresponding data" to the neighboring cell reference section 62 (in step S301). At this stage, the neighboring cell reference section 62 starts a normal channel search with respect to the neighboring cells with priority (in steps S309 to S316).

In other words, the neighboring cell reference section 62 reads out the channel information about the neighboring cells from the neighboring cell information storage section sequentially (in step S309). At this time, if there is a communication channel about which the channel search has already been performed, there is no need to read it out.

The channel selection section 8 selects a communication channel on the basis of the output from the neighboring cell reference section 62 (in step S310), and the channel monitor section 3 detects the channel state of the selected communication channel (in step S311). This procedure is repeated until a neighboring cell in a good state is found (in steps S309 to S312). If no communication channel of a good state is found after the channel check is performed as to all the neighboring cells (in steps S313), channel information is sequentially read out (in steps S314 to S316). In this case, if there is a communication channel as to which the channel search has already been performed, there is no need to read it out.

When the channel information retrieve section 60 outputs the previous capture time (in step S301), the capture time retrieve section 61 retrieves the nearest history information in terms of time to this previous capture time within the history information storage section 4 (in step S302). Thereafter, the capture time retrieve section 61 compares the difference between the thus retrieved capture time and the previous capture time with a predetermined value (in step S303). As a result, if the difference value exceeds the predetermined value, the capture time retrieve section 61 returns the information of "no corresponding data" to the neighboring cell reference section 62, and starts s normal channel search with respect to the neighboring cells with priority (in steps S309 to S316). On the other hand, if the difference is less than the predetermined value, the capture time retrieve section 61 outputs the channel information associated with that capture time.

When the capture time retrieve section 61 outputs the channel information (in step S303) the neighboring cell reference section 62 retrieves the channel information coincident with this channel information within the neighboring cell information storage section (in step S304). As a result, if there is a communication channel of the neighboring cell coincident with the channel information from the capture time retrieve section 61, it outputs the channel information to the channel selection section 8 (in step S305). On the other hand, if there is no such communication channel, it outputs the information of "no corresponding data" to the capture time retrieve section 61 (in step S305). The capture time retrieve section 61 that has received the information of "no corresponding data" retrieves the second nearest capture history to the previous capture time (in step S302).

The channel selection section 8 selects a communication channel on the basis of the channel information output from the neighboring cell reference section 62 (in step S306). That is, it sends the channel information to the channel monitor section 3, and sends a command to perform checking of that channel. The channel monitor section 3 detects the channel state of this communication channel, and returns the thus detected result to the channel selection section 8 (in step S307).

If the channel state is not good (in step S308), the capture time retrieve section 61 retrieves the second nearest capture time to the previous capture time (in step S302) on the basis of the instruction of the channel selection section 8. On the other hand, if the channel state is good, the channel selection section 8 captures that communication channel (in step S308).

When a communication channel is captured in steps S308, S313 and S316, the channel selection section 8 outputs channel information and a write request. Due to this, the neighboring cell information storage resumes the data updating operation. The history information write section 5 writes the time output from the timer section 3 in association with the channel information output from the channel selection section 8 into the history information storage section 4, and ends the process (in step S317).

When the mobile communication apparatus MS performs channel switching, it is highly possible that the communication channel to be newly captured is a communication channel adjacent to the communication channel currently captured, that is, a communication channel of the neighboring cell. For this reason, in the communication system in which the aforementioned GSM method is employed, channel information of the neighboring cells is provided to a mobile communication apparatus.

In this embodiment, history information of channel capture is first stored, and communication channels having high possibility of being captured are retrieved sequentially on the basis of this history information. Thereafter, among the retrieved channel information, the channel state of the channel information coincident with the channel information of the neighboring cell is checked with priory. In other words, among the communication channels of the neighboring cells, channel check is performed as to these communication channels in the order of possibility of being captured on the basis of the history information. Accordingly, compared with the mobile communication apparatus that checks the channel state of the communication channel of the neighboring cells in order, the channel switching can be performed in a shorter time.

It is to be noted that when a communication channel having high possibility of being captured is retrieved in this embodiment, the same method as the first embodiment is employed. However, the method same as that employed in the second embodiment can also be adopted. That is, although in the present embodiment, the procedure in the steps S300 to S302 is same as those in the steps S100 to S102 of the first embodiment, the procedure in steps S200 to S205 shown in FIG. 7 can also be employed for performing the same procedure.

(Fourth Embodiment)

Figure 10:
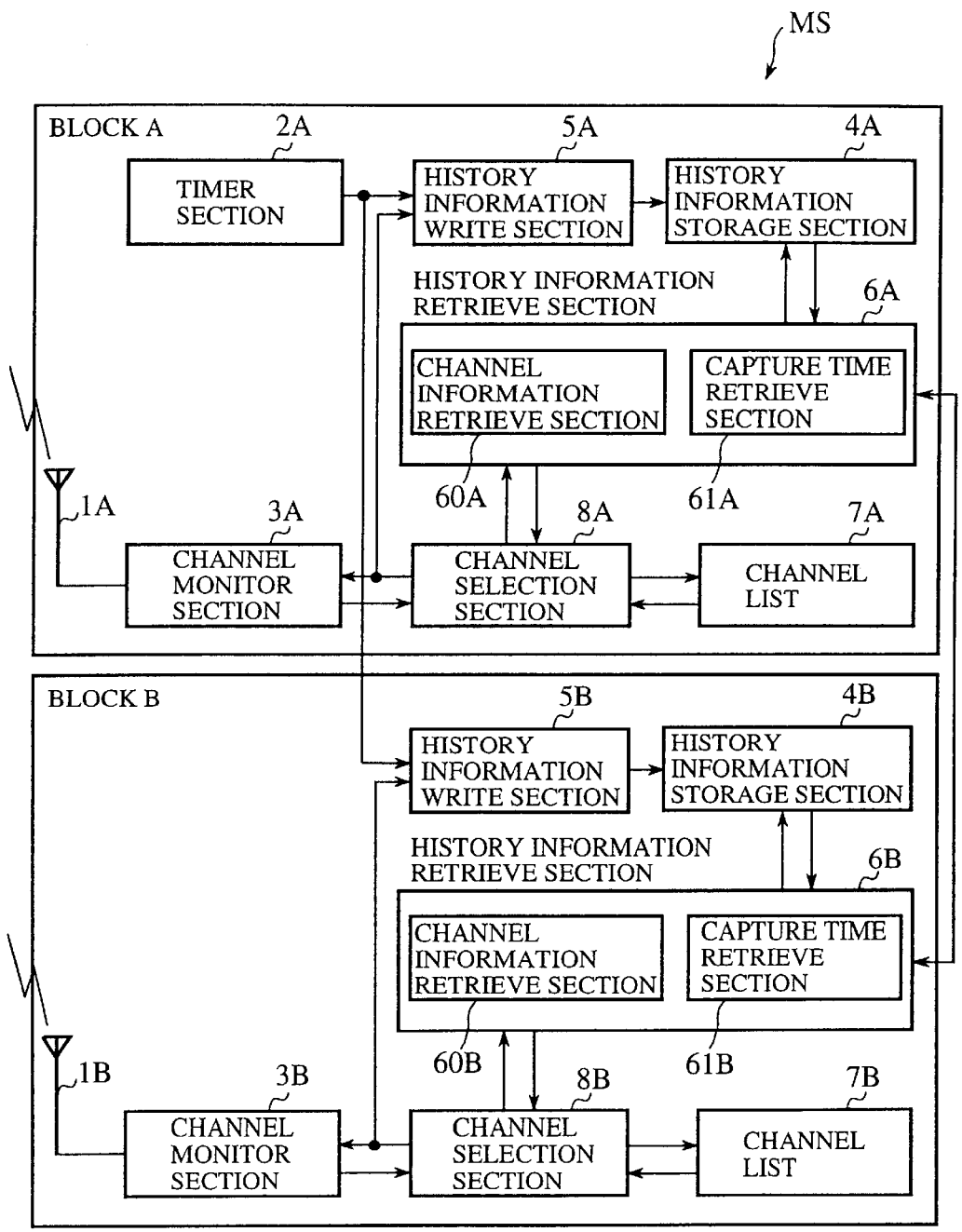
FIG. 10 is a block diagram showing one example of the arrangement of a mobile communication apparatus MS according to the present invention. This mobile communication apparatus is an apparatus capable of coping with two different communication systems A and B, and is provided with a block A corresponding to the communication system A, and a block B corresponding to the communication system B (fourth embodiment).

FIG. 10 is a block diagram showing one example of the arrangement of a mobile communication apparatus MS according to the present invention. This mobile communication apparatus is an apparatus for coping with two different communication systems A and B, and is configured by the block A corresponding to the communication system A, and the block B corresponding to the communication system B.

For example, this communication apparatus can be applied to a dual-mode portable telephone that selectively switches two different systems, wherein the communication system A is a terrestrial communication system, and the communication system B is a satellite communication system, and it can also be applied to the case where these systems A and B are both earth terrestrial communication systems yet having different frequency and/or communication mode.

The system configuration of each of the blocks A and B is substantially same as that of FIG. 1, and therefore in this embodiment, explanation about the portions observed in common concerning the inner configuration and/or inner operation thereof is omitted.

In FIG. 10, "A" is attached to the end portion of all the configuring elements in block A, while "B" is attached to the end portion of all the configuring elements in block B. Although the configurations of block A and block B are substantially the same, block A is provided with a timer section 2A, which is commonly used by block B which is not provided with a timer section of its own. That is, the history information write section SB writes the time output from the timer section 2A into the history information storage section 4B. Due to this, there is no time lag between the capture time stored in the history information storage section 4A and that stored in the history information storage section 4B, which time lag could possibly be caused otherwise by the timing discrepancy or the like of the two timer sections. Other structural elements can also be used commonly by both the blocks A and B.

This mobile communication apparatus MS performs communication using the communication channel provided by either one of the communication systems A and B. That is, when only the communication channel provided by either one of the communication channels can be captured, the communication channel of that communication system is used. On the other hand, if the communication channel of the both systems A and B can be captured, a communication channel whose channel state is better, which is more economical, or which is provided by the system specified by a user, can be employed.

By the way, there is a case as the case in which while the communication channel of either one of the systems is currently captured, switching to the other system for capturing the communication channel of the other system is performed. Some of the reasons for this switching include the case in which the channel state of the communication channel currently captured has degraded, and the case in which the user has set in such a manner that the other system has priority, and the channel state thereof becomes better, or the case in which the user has instructed the switching of system and so on.

When switching from the system A to the system B, the channel information storage section 60A in the block A outputs the previous capture time obtained by the retrieval to the block B. In other words, the channel information retrieve section 60A outputs the result of the retrieval of the history information storage section 4A of the system A, and the capture time retrieve section 61B retrieves the history information storage section 4B of the system B, taking this result as a key element. On the other hand, when switching from the system B to the system A, the channel information retrieve section 60B outputs the previous capture time obtained by the retrieval to the block A.

Here, the case in which the system A is switched to the system B is taken as an example to explain. The switching of system is started from the generation of system switching event. If it is caused due to the fact that none of the communication channels in system A can be captured according to the result of the channel search, it means that the channel information retrieve section 60A has already terminated the retrieval of the previous capture time, and thus the section 60A outputs the result of the retrieval, that is, either the previous capture time or the information of "no corresponding data". On the other hand, if the event is based on the user's instruction, by the step S100 in FIG. 5, the channel information retrieve section 60A retrieves the previous capture time, and thereafter it outputs the thus found capture time or the information "no corresponding data".

The block B operates in accordance with the steps S101 to S110 in FIG. 5 on the basis of the output from the block A. In other words, in the case that system A outputs the previous capture time (in step S101), the capture time retrieve section 61B performs the data retrieval of the history information storages section 4B (in step S102), taking this previous capture time as a key element. On the other hand, if the system A outputs the information of "no corresponding data" (in step S101), communication channels are sequentially selected on the basis of the channel list 7B, and the channel check is carried out.

A mobile communication apparatus according to the present embodiment is capable of coping with two or more than two communication systems, and performs the channel check in the order based on the history information of the previously conducted channel switching operations. That is, the apparatus first individually stores the history information of communication channels for each of the communication systems, and at the time of system switching, it obtains the previous capture time in one system, then retrieves the communication channel captured around this previous capture time in the other system, and performs thereafter the channel checking thereof with priority. Accordingly, the time required for channel search can be greatly reduced.

(Fifth Embodiment)

In the above fourth embodiment, it is explained that in the case in which system A is switched to system B, the block A outputs the previous capture time obtained in accordance with the first embodiment. However, in this embodiment, it is explained in the case that the block A outputs the reference capture time obtained in accordance with the second embodiment.

Figure 11:
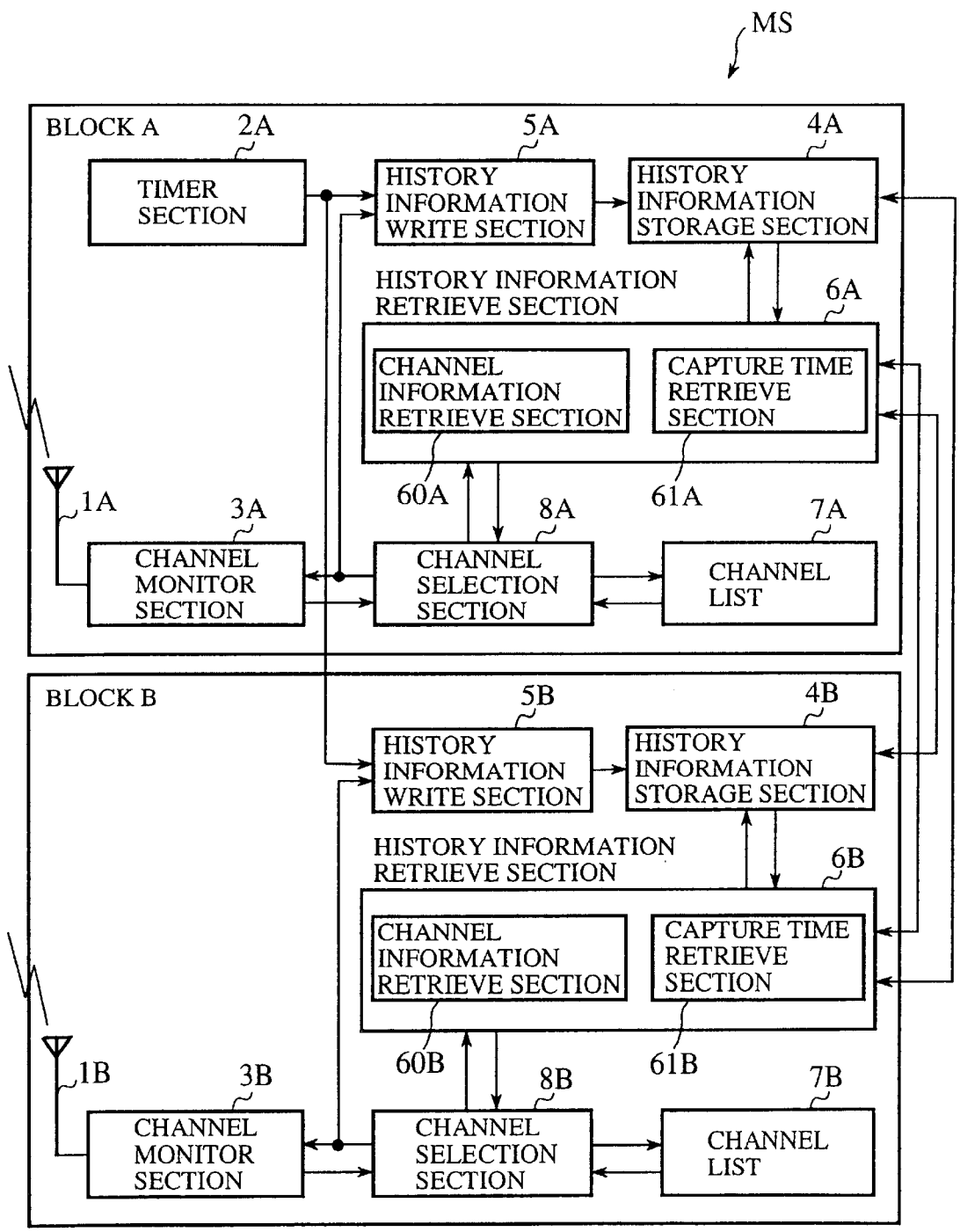
FIG. 11 is a block diagram showing one example of the arrangement of a mobile communication apparatus MS according to the present invention. This mobile communication apparatus is different from the mobile communication apparatus shown in FIG. 10 in that the capture time retrieving section 61A in the block A checks the history information storing section 4B in the block B to obtain the reference capture time, and the capture time retrieving section 61B in the block B checks the history information storing section 4A in the block A to obtain the reference capture time (fifth embodiment).

FIG. 11 is a block diagram showing one example of the arrangement of a mobile communication apparatus MS according to the present invention. In this mobile communication apparatus, the capture time retrieving section 61A in the block A retrieves the history information storing section 4B in the block B to obtain a reference capture time, and the capture time retrieving section 61B in the block B retrieves the history information storing section 4A in the block A to obtain a reference capture time, which is different from the mobile communication apparatus shown in FIG. 10. Accordingly, in this embodiment, explanation about the points common to those in the fourth embodiment concerning the configuration of and/or operation of the mobile communication apparatus is omitted.

Here, the case in which the system A is switched to the system B is taken as an example to explain. In step S200 of FIG. 7, the channel information retrieve section 60A in the block A retrieves the history information storage section 4A, taking the channel information of the currently captured communication channel as a key element, and obtain the first capture time. Next, by the procedure in steps S201 to S204 of FIG. 7, the capture time retrieve section 61A retrieves the history information storage section 4B in the block B, taking the first capture time as a key element, and obtain the second capture time, and thereafter obtains the difference between the first and second capture time of each combination, so as to acquire a reference capture time.

The capture time retrieve section 61A outputs this reference capture time to the block B. However, if the channel information retrieve section 60A cannot find the previous capture time in step S200, it outputs the information of "no corresponding data".

The block B operates in accordance with the procedure in steps SS205 to S213 of FIG. 7. That is, in the case that the system A outputs the reference capture time, the capture time retrieves section 61B retrieves the data stored in the history information storages section 4B (in step S205), taking this previous capture time as a key element. On the other hand, if the system A outputs such information as "no corresponding data", it selects communication channels sequentially on the basis of the channel list 7B, and performs channel checking (in step S201 to S212).

A mobile communication apparatus according to the present embodiment copes with two or more than two communication systems, and performs channel check in the order based on the history information of the previous channel switchings. That is, the apparatus first stores history information of communication channels for each of the communication systems, and obtains a reference capture time on the basis of the capture history in the both systems at the time of system switching, then retrieves the communication channel captured around this reference capture time in the other system, and performs thereafter the channel checking thereof with priority. Accordingly, the time required for channel search can be greatly reduced.

As explained above, in this embodiment, channel search can be performed by retrieving the communication channels on the basis of the history information in which the same communication channel was captured before the previous capture time, or earlier than that. For this reason, even in a case that the communication channel cannot be retrieved by the previous capture time, the time required for channel search can be greatly reduced.

Further, as explained above, in this embodiment, in a case that no system switching was performed around the previous capture time, channel search can be performed in the other system on the basis of the capture time of the same communication channel of the before-previous time at which system was switched, or earlier than that. Due to this, even in a case that the communication channel cannot be retrieved by the previous capture time, the time required for channel search can be greatly reduced.

What is claimed is:

1. A communication channel selection method, comprising the steps of:
    storing the capture time of communication channels, each being associated with the respective communication channels as history information,
    retrieving the history information stored by said storing step at the time of switching of the communication channels,
    selecting a communication channel on the basis of the result of said retrieving step,
    detecting the channel state of the communication channel selected by said selecting step, and
    capturing the selected communication channel on the basis of the result of said detecting step.

2. A communication channel selection method according to claim 1, wherein said retrieving step further comprises the steps of:
    retrieving channel information for acquiring the capture time associated with the same communication channel as the communication channel currently captured, and
    retrieving the capture time for acquiring the nearest capture time to the capture time acquired by said information retrieving step, and wherein said selecting step selects a communication channel associated with the capture time acquired by said capture time retrieving step.

3. A communication channel selection method according to claim 2, wherein said capture time retrieving step further comprises the step of retrieving the second nearest capture time to the capture time obtained by said channel information retrieving step on the basis of the result of said detecting step.

4. A communication channel selection method according to claim 2, wherein when two or more than two capture times are obtained by said channel information retrieving step, said capture time retrieving step retrieves on the basis of the previous capture time of the currently captured communication channel.

5. A communication channel selection method according to claim 2, wherein when two or more than two capture times are obtained by said channel information retrieving step, said capture time retrieving step retrieves the nearest capture time to each of the capture times, and said selecting step selects, among the communication channels associated with the nearest capture times obtained by said capture time retrieving step, a communication channel associated with the capture time whose time difference from the corresponding capture time obtained by said channel information retrieving step is the shortest.

6. A communication channel selection method according to claim 1, wherein said storing step stores the capture time for each of communication systems that provide communication channels, and said retrieving step performs data retrieval at the time of switching of the communication system as to the capture time stored in the respective communication systems before or after the switching operation.

7. A communication channel selection method according to claim 6, wherein said retrieving step further comprises the steps of: retrieving channel information for retrieving the capture time associated with the same communication channel as the channel currently captured on the basis of the capture time regarding the communication system before the switching operation stored by said storing step, and retrieving capture time for retrieving the nearest capture time to the capture time obtained by said channel information retrieving step on the basis of the capture time regarding the communication system after the switching operation stored by said retrieving step, and wherein said selecting step selects a communication channel associated with the capture time obtained by said capture time retrieving step.

8. A communication channel selecting method according to claim 6, wherein said storing step stores the capture time individually for communication channels of a terrestrial communication system, and for communication channels of a satellite communication system.

9. A mobile communication apparatus comprising:
    a history information storing section for storing the capture time of communication channels, each being associated with the respective communication channels as history information,
    a history information retrieving section for retrieving the history information stored in said history information storing section at the time of switching of the communication channels,
    a channel selecting section for selecting a communication channel on the basis of the result of the retrieval conducted by said history information retrieving section, and a channel monitoring section for detecting the channel state of the communication channel selected by said channel selecting section, Wherein said apparatus captures the selected communication channel on the basis of the result of the detection conducted by said channel monitoring section.

10. A mobile communication apparatus according to claim 9, wherein said history information retrieving section further comprises:

a channel information retrieving section for acquiring the capture time associated with the same communication channel as the communication channel currently captured, and a capture time retrieving section for acquiring the nearest capture time to the capture time acquired by said channel information retrieving section, and wherein said selecting step selects a communication channel associated with the capture time acquired by said capture time retrieving section.

11. A mobile communication apparatus according to claim 10, wherein said capture time retrieving section retrieves the second nearest capture time to the capture time obtained by said channel information retrieving section on the basis of the result of the detection conducted by said channel monitoring section.

12. A mobile communication apparatus according to claim 10, wherein when two or more than two capture times are obtained by said channel information retrieving section, said capture time retrieving section retrieves on the basis of the previous capture time of the currently captured communication channel.

13. A mobile communication apparatus according to claim 10, wherein when two or more than two capture times are obtained by said channel information retrieving section, said capture time retrieving section retrieves the nearest capture time to each of the capture times, and said channel selecting section selects, among the communication channels associated with the nearest capture times obtained by said capture time retrieving section, a communication channel associated with the capture time whose time difference from the corresponding capture time obtained by said channel information retrieving section is the shortest.

14. A mobile communication apparatus according to claim 9, wherein said history information storing section is formed by two or more than two storing sections for storing the capture time for each of the communication systems that provide communication channels, and said history information retrieving section performs data retrieval, at the time of switching of the communication systems, in the storing section as to the respective communication systems before or after the switching operation.

15. A mobile communication apparatus according to claim 14, wherein said history information retrieving section further comprises in the storing section of the communication system before the switching operation, a channel information retrieving section for retrieving the capture time associated with the same communication channel as the channel currently captured, and in the storing section as to the communication system after the switching operation, a capture time retrieving section for retrieving the nearest capture time to the capture time obtained by said channel information retrieving section, wherein said channel selecting section selects a communication channel associated with the capture time obtained by said capture time retrieving section.

16. A mobile communication apparatus according to claim 14, wherein said history information storing section is composed of a storing section for storing the capture time independently for communication channels of a terrestrial communication system, and for communication channels of a satellite communication system.

* * * * *